UNITED STATES PATENT OFFICE.

GEORGE G. CROWELL, OF LIME ROCK, CONNECTICUT.

IMPROVEMENT IN HARDENING SPRINGS.

Specification forming part of Letters Patent No. 58,990, dated October 23, 1866.

*To all whom it may concern:*

Be it known that I, GEORGE G. CROWELL, of Lime Rock, in the county of Litchfield, in the State of Connecticut, have invented certain new and useful Improvements in the Means for Hardening Springs and other articles of steel or iron; and I do hereby declare that the following is a full and exact description thereof.

It has been common for a long period to apply prussiate of potash or other chemicals to the surface of iron in order to impart carbon to the metal and induce a condition approximating that of steel upon the surface; the operation being conducted by maintaining the articles at a high temperature in a close vessel for a considerable time, and then plunging them suddenly in water.

My invention is intended to act by a method somewhat analogous; and the difference consists in the use of materials not before so employed. I employ glue or kindred animal matter, gelatine or the like, either alone or in combination with prussiate of potash, &c.

I will first describe what I consider the best means of carrying out my invention, and will afterward designate the point which I believe to be new.

I take common glue, such as is used by cabinet-makers and other workers in wood, and reduce it, by heating in water, to about the consistency suitable for application to woodwork. I then mix therewith powdered prussiate of potash, maintaining the temperature of the glue, and stirring the mixture until it is thickened by the application of the prussiate to a consistency about like ordinary soft soap. The precise proportion of the two ingredients need not be very nicely determined. I usually add about one-quarter as much prussiate of potash as there is of the glutinous fluid. I then dip the iron or steel articles which are to be hardened in this compound. A thin coating adheres and soon hardens upon the surface. The repeated introduction of cold iron or steel into the compound rapidly lowers its temperature, which must be guarded against by the continual application of heat to the mass, unless it is preferred, for some purposes, to employ a very thick coating of the compound. The articles of iron or steel thus prepared are afterward heated in a close vessel for an hour, or for a greater or less period, maintaining the temperature at a cherry-red, and then suddenly plunged into cold water or oil.

I have employed this compound with great success in the treatment of files preparatory to the hardening thereof. I believe that good cast-steel is changed in its mechanical structure by the distortion produced in raising the teeth of files, so that the metal composing each tooth is less perfect steel than the general body of the file. I believe that the imparting of additional carbon thereto improves the quality by restoring wholly or in part the completely steelified condition. Whether this be true or not, I have demonstrated by repeated experiments that my files are better for having been hardened within a coating of the compound above described. The common paste, made of rye-flour or other farinaceous matter, may be applied upon the outside of my glutinous coating if desired.

I can, instead of prussiate of potash, employ cyanide of potassium, and, instead of glue, can employ gelatine or any semi-fluid animal matter which is tenacious and will perform as above described. I have used a coating of glue alone with good effect, but esteem it much better to mix the prussiate, as above specified.

Having now fully described my invention, what I claim as new, and desire to secure by Letters Patent, is as follows:

The employment of glue or equivalent glutinous animal matter, either alone or in combination with other material, as a hardening compound, when employed substantially in the manner and for the purpose herein set forth.

GEO. G. CROWELL.

Witnesses:
A. F. MORCE,
WM. A. CROWELL.